United States Patent [19]
Meyn

[11] 4,071,924
[45] Feb. 7, 1978

[54] APPARATUS FOR REMOVING A FOWL FROM A CONVEYOR

[76] Inventor: Pieter Meyn, Noordeinde 72, Oostzaan, Netherlands

[21] Appl. No.: 656,827

[22] Filed: Feb. 9, 1976

[51] Int. Cl.² ............................................. A22B 5/00
[52] U.S. Cl. .......................................... 17/24; 17/44.1
[58] Field of Search ........................... 17/24, 44.1, 11; 198/680, 484, 483

[56] References Cited

U.S. PATENT DOCUMENTS

| | | | |
|---|---|---|---|
| 3,006,453 | 10/1961 | Tonelli | 198/680 X |
| 3,097,391 | 7/1963 | Wayne | 17/44.1 |
| 3,166,785 | 1/1965 | Lemmond | 17/44.1 |
| 3,416,186 | 12/1968 | Zebath et al. | 17/44.1 X |
| 3,548,448 | 12/1970 | Vertegaal | 17/24 X |
| 3,708,829 | 1/1973 | Klevgard | 17/11 |

*Primary Examiner*—Robert Peshock
*Attorney, Agent, or Firm*—Haseltine, Lake & Waters

[57] ABSTRACT

An apparatus for removing from an overhead conveyor a fowl which is supported by ankle joints in the hooks at the lower end of a conveyor hanger. The fowl is carried along a stationary guide rail bearing against the fowl's legs while the conveyor hanger is held against movement relative to the path of this conveyor. The guide rail is shaped in such manner that the fowl is tilted away from the conveyor hanger by the guide rail as it is carried along by the conveyor so that the ankle joints of the fowl are lifted out of the hooks of the conveyor hanger one by one.

4 Claims, 5 Drawing Figures

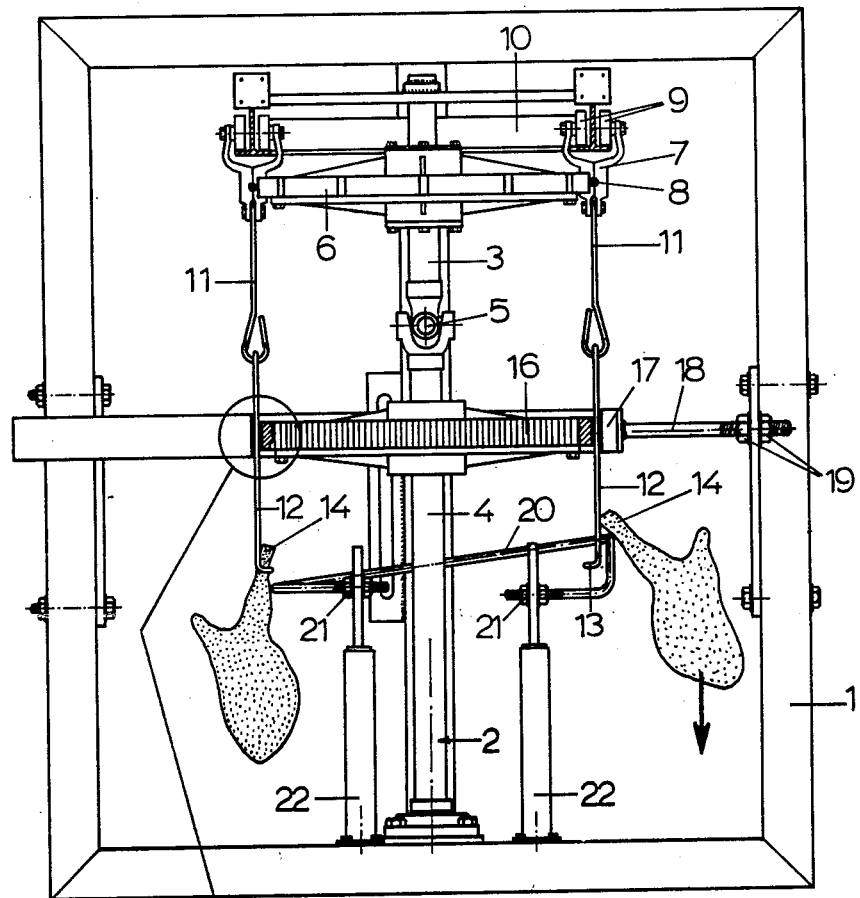
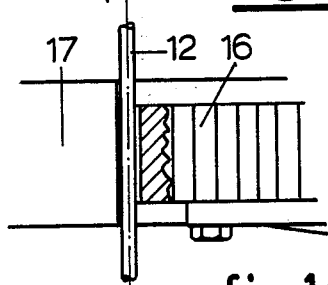
fig.1
fig.1a

APPARATUS FOR REMOVING A FOWL FROM A CONVEYOR

FIELD OF THE INVENTION

The invention relates to an apparatus for removing from a conveyor a fowl, which is hanging by the ankle joints from hooks formed at the lower ends of the legs of a generally U-shaped conveyor hanger.

BACKGROUND

In most modern slaughter houses the fowl are subjected to a large number of different treatments while they are hanging from the hangers of a conveyor. After these various treatments have been carried out, the fowl have to be removed from the conveyor. Hitherto this has been done by hand, which of course takes substantial amounts of time and work.

SUMMARY OF THE INVENTION

According to the invention there is provided an apparatus for removing from a conveyor a fowl, which is hanging by the ankle joints from hooks formed at the lower ends of the legs of a generally U-shaped conveyor hanger, clamping means being provided for gripping the legs of the hanger and moving the hanger along a stationary guide rail which abuts against the legs of the fowl and is shaped in such manner that the fowl is upwardly tilted away from the hanger and the ankle joints of the fowl are lifted out of the hooks one after the other.

Advantageously, the apparatus is constructed in the manner of a merry-go-round, the legs of the hanger being clamped between the toothed outer edge of a horizontal clamping wheel, mounted for rotation about a vertical central axis and a stationary clamping rail, in such manner that the hanger cannot be vertically or radially moved relative to the stationary guide rail.

Preferably, the guide rail is contained within a sloping plane intersecting with a horizontal plane containing the hooks of the hanger, while the projection of the guide rail on said horizontal plane lies at a substantially constant distance outside the path of the gripped hanger, the hanger being moved along the guide rail starting from the lower side of said sloping plane.

Finally the clamping wheel is preferably driven by the conveyor by means of a universal joint.

BRIEF DESCRIPTION OF THE DRAWINGS

The invention will be further described by way of example with reference to the accompanying drawings, in which:

FIG. 1 is a side view of an apparatus according to the invention;

FIG. 1a is an enlargement of a detail in FIG. 1;

DESCRIPTION OF A PREFERRED EMBODIMENT

Figure 2:
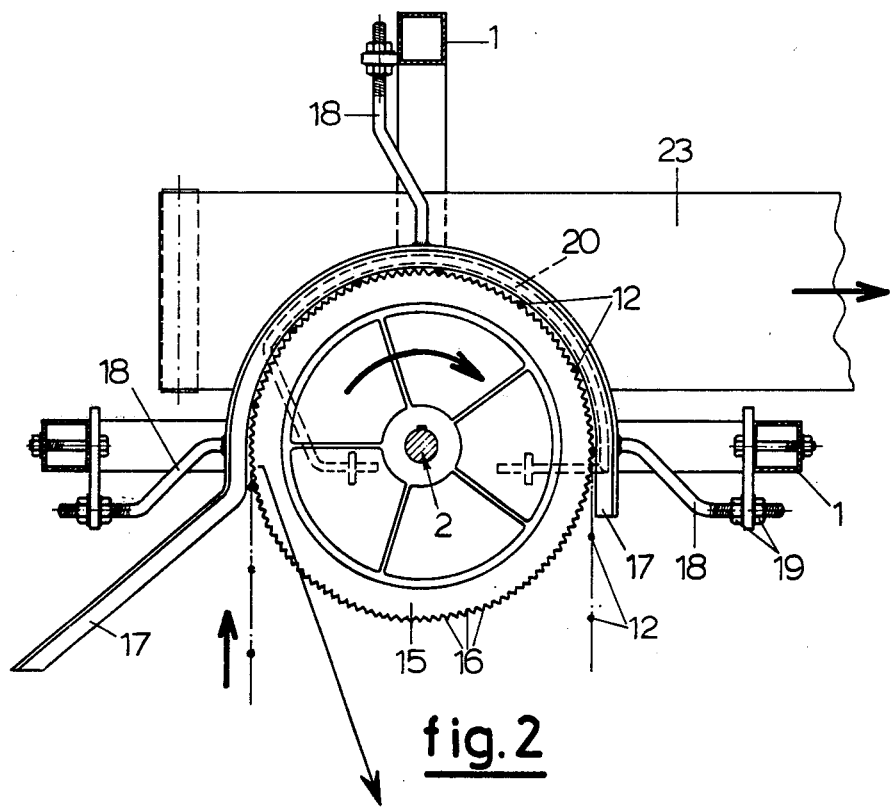
FIG. 2 is a top view of the apparatus shown in FIG. 1.
Figure 2A:
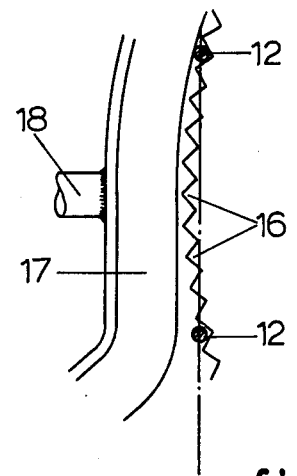
FIG. 2a is an enlargement of a detail in FIG. 2.

The apparatus depicted in the drawings comprises a frame 1, in which a vertical shaft 2 is mounted for rotation. The shaft 2 comprises two sections 3 and 4, which are coupled together by means of a universal joint 5.

A driving wheel 6 is mounted on the upper shaft section 3, the circumferential edge of which is provided with a number of notches for receiving the support elements 7 of a conveyor. The support elements 7 are attached at regular intervals to a pulling cable 8 and by means of rollers 9 slidingly carried by a conveyor rail 10 parallel to the outer edge of the driving wheel.

Each of the support elements 7 is provided with a hanger rod 11 from which a U-shaped hanger 12 depends. The hanger 12 is, as clearly shown in FIG. 3, at its lower end provided with two hooks 13, in which the ankle joints 14 of a fowl carried by the hanger 12 are contained.

The lower shaft section 4 carries a clamping wheel 15, the outer periphery of which is made from a plastic material and is provided with teeth 16. The clamping wheel cooperates with a clamping rail 17 which surrounds about half of the circumference of the clamping wheel and is coated with a layer of plastic material, so that the outer legs of the hangers 12 can be clamped between the teeth 16 of the clamping wheel 15 and the clamping rail 17, as is clearly shown in FIG. 2. The clamping rail 17 is provided with support arms 18 whose free ends are adjustably connected to the frame 1 by means of nuts 19.

A stationary curved guide rail 20 is placed below the clamping wheel 15 and is adjustably connected by means of nuts 21 to supports 22 attached to the frame 1. The guide rail 20 is contained within a plane inclined with respect to a horizontal plane, containing the hooks 13 of the hangers 12. The vertical projection of the guide rail 20 lies concentrically outside of the vertical projection of the circumferential edge of the clamping wheel 15.

During the operation of the apparatus the support elements 7 of the conveyor are pulled along the rail 10 by the pulling cable 8 and received one after the other within the notches of the driving wheel 6, so that the driving wheel 6 is carried along by the pulling cable 8. At the same time the outer legs of the hangers 12, carried by the support elements 7, are received between the teeth 16 of the clamping wheel 15. As the clamping wheel is coupled to the driving wheel 6 by means of the shaft 2, the clamping wheel is also rotated by the pulling cable 8, as is shown in FIG. 2 by means of an arrow. Thus the hangers 12 are subsequently clamped between the clamping rail 17 and the clamping wheel 15, the diameter of which equals the diameter of the driving wheel, in such manner that hangers cannot be moved relative to the clamping wheel by which they are carried along.

Figure 3:
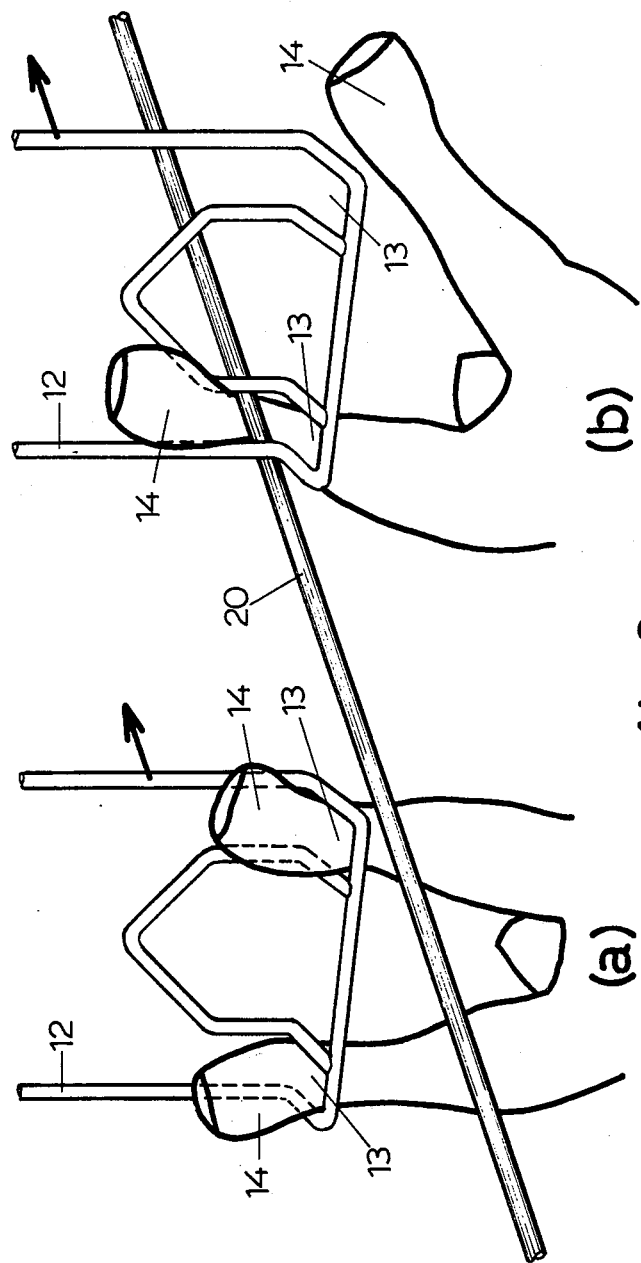
FIG. 3 illustrates the manner in which the ankle joints of a fowl are freed from the hooks of a conveyor hanger.

When the legs of a fowl hanging from one of the hangers 12 are brought into contact with the lower part of the guide rail 20, which lies underneath the plane of the hooks 13 of the hangers 12, and are moved along the guide rail 20 in the direction of the arrows shown in FIG. 3 towards the upper part of the guide rail, which lies above the plane of the hooks, the legs of the birds are slowly pushed outwards and upwards by the guide rail, so that the ankle joints 14 of the fowl are lifted out of the hooks 13 of the hanger 12, one after another, as shown in FIG. 3. After the fowl is freed from the hanger 12 it drops onto a conveyor belt 23, which carries the fowl away from the apparatus.

What is claimed is:

1. An apparatus for removing a fowl from an overhead conveyor traveling along a path which is part of a circle, said conveyor including at least one generally U-shaped conveyor hanger having legs with hooks at its lower end for gripping the fowl's ankle joints, said apparatus comprising a stationary frame;

a stationary guide rail attached to said frame and positioned relative to the path of said conveyor in such a manner that the legs of the fowl carried by said conveyor hanger abut against said guide rail;

clamping means operationally connected with said frame for gripping the legs of said conveyor hanger, and means for moving said clamping means along said path in synchronism with said conveyor;

said guide rail being shaped in such manner that, while being moved along said guide rail, the fowl is tilted away from said conveyor hanger which is gripped by said clamping means, so that the ankle joints of the fowl are lifted out of said hooks one after the other, said clamping means comprising a horizontal clamping wheel mounted in said frame for rotation about a vertical axis and provided with a toothed outer periphery, and a stationary clamping rail attached to said frame and cooperating with said toothed outer edge for locking the legs of the conveyor hanger therebetween, said clamping rail being concentric with the clamping wheel and extending along a portion of the circumference of said clamping wheel so that the legs of said conveyor hanger can enter between the circumference of said clamping wheel and said clamping rail and be gripped between the teeth at the outer periphery of said clamping wheel and said clamping rail to be held against vertical and radial movement relative to said stationary guide rail.

2. Apparatus according to claim 1, wherein said guide rail is contained within an inclined plane intersecting a horizontal plane containing said hooks of said conveyor hanger, whereas the projection of said guide rail on said horizontal plane lies substantially constant distance outside said path of said conveyor, said hanger being moved along said path by said conveyor from the lower side of said inclined plane towards the higher side thereof.

3. Apparatus according to claim 1, wherein said means for moving said clamping means comprises a horizontal driving wheel connected with said clamping wheel, said driving wheel being engaged by said conveyor over part of its circumference so that it is directly driven by said conveyor.

4. Apparatus according to claim 3, further comprising a universal shaft coupling connecting said driving wheel with said clamping wheel.

* * * * *